US011435717B2

United States Patent
Mitterreiter

(10) Patent No.: US 11,435,717 B2
(45) Date of Patent: Sep. 6, 2022

(54) MEASURING DEVICE FOR A SPINDLE OR A ROTARY TABLE

(71) Applicant: DR. JOHANNES HEIDENHAIN GmbH, Traunreut (DE)

(72) Inventor: Johann Mitterreiter, Chieming (DE)

(73) Assignee: DR. JOHANNES HEIDENHAIN GmbH, Traunreut (DE)

( * ) Notice: Subject to any disclaimer, the term of this patent is extended or adjusted under 35 U.S.C. 154(b) by 668 days.

(21) Appl. No.: 16/458,761

(22) Filed: Jul. 1, 2019

(65) Prior Publication Data

US 2020/0012256 A1    Jan. 9, 2020

(30) Foreign Application Priority Data

Jul. 4, 2018  (DE) .................... 10 2018 210 989.3

(51) Int. Cl.
  *G01B 7/30* (2006.01)
  *G05B 19/402* (2006.01)
  (Continued)

(52) U.S. Cl.
  CPC ............ *G05B 19/402* (2013.01); *B23Q 1/70* (2013.01); *G01B 7/30* (2013.01); *G01B 21/045* (2013.01);
  (Continued)

(58) Field of Classification Search
  CPC . G01B 7/32; G01D 5/145; G01D 5/16; G01D 5/142
  See application file for complete search history.

(56) References Cited

U.S. PATENT DOCUMENTS

| 10,527,399 B2 * | 1/2020 | Riesemann .......... H01R 13/565 |
| 10,903,731 B2 * | 1/2021 | Woo ..................... G01D 5/2451 |

(Continued)

FOREIGN PATENT DOCUMENTS

| CN | 101439411 A | 5/2009 |
| CN | 102679927 A | 9/2012 |

(Continued)

OTHER PUBLICATIONS

European Search Report issued to corresponding EP Application No. 19168345 from the European Patent Office dated Nov. 20, 2019.

(Continued)

*Primary Examiner* — Reena Aurora
(74) *Attorney, Agent, or Firm* — Carter, DeLuca & Farrell LLP

(57) ABSTRACT

A measuring device for a spindle or for a rotary table includes at least two first and second position sensing elements and a scale element, having a first and second graduations and being rotatable about an axis of rotation relative to the position sensing elements. The first graduation includes regular structures arranged in parallel next to one another along a first direction, having a directional component in the circumferential direction. The second graduation includes regular structures arranged in parallel next to one another along a second direction, having a directional component in the axial direction. The first position sensing elements are offset from one another in the circumferential direction, and are able to scan the first graduation so that the position of the scale element in a plane having an orthogonal orientation to the axis of rotation is determinable. In addition, at least one of the first position sensing elements is able to determine an angular position of the scale element in relation to the first position sensing elements in absolute terms within and across a rotation. The second position (Continued)

sensing elements are offset from one another in the circumferential direction, and are able to scan the second graduation, and the axial position of the scale element is able to be determined.

16 Claims, 3 Drawing Sheets

(51) Int. Cl.
    *G01B 21/04*     (2006.01)
    *G01D 5/12*     (2006.01)
    *G01D 5/347*     (2006.01)
    *B23Q 1/70*     (2006.01)
    *G01D 5/249*     (2006.01)

(52) U.S. Cl.
    CPC ............ *G01D 5/12* (2013.01); *G01D 5/3473* (2013.01); *G01D 5/2497* (2013.01); *G01D 2205/90* (2021.05); *G05B 2219/50047* (2013.01)

(56) References Cited

U.S. PATENT DOCUMENTS

| | | |
|---|---|---|
| 2009/0133545 A1 | 5/2009 | Tanaka |
| 2009/0219016 A1* | 9/2009 | Debrailly ............... G01D 5/145 324/207.25 |
| 2014/0111191 A1 | 4/2014 | Andre et al. |
| 2014/0311364 A1 | 10/2014 | Cantrell |

FOREIGN PATENT DOCUMENTS

| | | |
|---|---|---|
| CN | 203011370 U | 6/2013 |
| CN | 104942775 A | 9/2015 |
| DE | 19803249 A1 | 8/1998 |
| EP | 1202025 A2 | 5/2002 |
| JP | 2010-217167 A | 9/2010 |
| WO | 2015075136 A1 | 5/2015 |

OTHER PUBLICATIONS

Office Action issued in corresponding Chinese Patent Application No. 201910598504.0, dated Mar. 3, 2022, pp. 1-7.

* cited by examiner

MEASURING DEVICE FOR A SPINDLE OR A ROTARY TABLE

CROSS-REFERENCE TO RELATED APPLICATIONS

The present application claims priority to Application No. 10 2018 210 989.3, filed in the Federal Republic of Germany on Jul. 4, 2018, which is expressly incorporated herein in its entirety by reference thereto.

FIELD OF THE INVENTION

The present invention relates to a measuring device for a position measurement for spindles or rotary tables and to a component assembly for a spindle or for a rotary table including a corresponding measuring device.

BACKGROUND INFORMATION

The particular spindles or rotary tables are frequently used in machining equipment or machining centers. Spindles or motor spindles often hold a rotating tool such as a cutting tool in machine tools. Workpieces are fastened in place on rotary tables and then processed by machine cutting, for example. In addition, rotary tables are used in measuring machines, and a workpiece attached to the rotary table is measured in such equipment. Spindles or rotary tables of this type are frequently equipped with angle-measuring devices, which are used for measuring rotatory movements of a shaft. Angle-measuring devices are particularly used in machine tools or measuring machines for the purpose of measuring rotatory movements. There exists a growing demand for an increase in the performance of such spindles or rotary tables, in particular in the precision during the operation.

Japanese Patent Document No. 2010-217167 describes a measuring device having an encoder, with the aid of which a rotational frequency of a shaft can be measured and which also generates signals from which an axial loading of the shaft can be inferred.

SUMMARY

Example embodiments of the present invention provide a measuring device, which is suitable for a spindle or for a rotary table and which makes it possible to determine the position of an axis of rotation in multiple directions during an ongoing operation.

According to an example embodiment of the present invention, the measuring device is suitable for a spindle or for a rotary table and includes at least two first position sensing elements, at least two second position sensing elements, and a scale element, which has a first graduation or first scale and a second graduation or second scale. The scale element is arranged so as to be rotatable about an axis of rotation relative to the first and the second position sensing elements. The first graduation includes regular structures, which are arranged in parallel next to one another along a first direction, the first direction having a directional component in the circumferential direction. The second graduation includes regular structures, which are arranged in parallel next to one another along a second direction, the second direction having a directional component in the axial direction. The at least two first position sensing elements are disposed at an offset from one another in the circumferential direction, and the first graduation is scannable by the at least two first position sensing elements so that the position of the scale element in a plane that has an orthogonal orientation relative to the axis of rotation is able to be determined (and thus the position of the axis of rotation or an axle displacement under an operating load). In addition, an angular position of the scale element in relation to the first position sensing elements (e.g., relative to the position sensing elements) within and across a rotation is able to be determined in absolute terms by scanning the first graduation with the aid of at least one of the first position sensing elements. The at least two second position sensing elements are also disposed at an offset from one another in the circumferential direction, and the second graduation is able to be scanned by the second position sensing elements, and the axial position of the scale element (and thus an axle displacement in the axial direction under an operating load) is able to be determined.

The use of at least one of the first position sensing elements makes it possible to determine an angular position of the scale element in relation to the first position sensing elements in absolute terms within and across a rotation. For example, this is achievable by providing the first graduation with an absolute code track or else by applying a reference mark on the scale element, which, in conjunction with an incremental graduation, allows for an absolute determination of the angular position within a rotation.

The first direction along which the regular structures of the first graduation are situated next to one another may be identical to the circumferential direction. In the same manner, the first direction may be inclined or obliquely positioned (but not perpendicular to the circumferential direction) with respect to the circumferential direction. Similarly, the second direction along which the regular structures of the second graduation are disposed next to one another may be arranged identically to the axial direction (and thus parallel to the axis of rotation). In a similar manner, the second direction may extend at an incline or obliquely with respect to the axial direction (but not perpendicular to the axial direction). For example, regular structures of the first graduation and those of the second graduation may be oriented in the form of an arrow relative to one another.

The measuring device may have at least three first position sensing elements and at least three second position sensing elements.

The measuring device may have a circuit board on which at least one electronic component is secured in place. The first position sensing elements are electrically connected to the electronic component so that signals from the first position sensing elements are able to be processed by the electronic component. Alternatively or additionally, the second position sensing elements are electrically connected to the electronic component so that signals from the second position sensing elements are able to be processed by the electronic component. A processor or a microcontroller, in particular, may be provided as an electronic component.

The circuit board has, for example, an annular shape, e.g., a closed ring shape, in which the annular circuit board arranged as a closed ring that extends across 360°, an open ring shape, e.g., an open ring segment, for instance, that extends across at least 180°, and in particular across at least 270°, etc.

The first position sensing elements and the second position sensing elements may be electrically connected to the electronic component, and the angular position of the scale element, the position of the scale element in the plane perpendicular to the axis of rotation, and the axial position of the scale element may be able to be determined with the aid of the electronic component.

Tilting of the scale element, and thus tilting of the axis of rotation, may be determinable with the aid of the second position sensing elements. In particular, the at least two position sensing elements may be electrically connected to the electronic component, and the electronic component is able to determine the tilting of the scale element. It may be particularly beneficial in this context to use three or more second position sensing elements.

In the case of spindles or rotary tables, which by nature have a correspondingly stiff development, such tilting is relatively minor and lies in ranges of less than one angular minute relative to the ideal axis of rotation, e.g., 100 angular minutes down to 50 angular minutes. As a result, it is also the case that only minimal position changes are encountered due to such tilting, which means that the measuring device must have a very high resolution in order to provide reliable information or quantitative values in connection with the tilting. Since the axis of rotation may possibly rotate, the described tilting may lead to tumbling motions of the scale element, such tumbling motions being recordable in quantitative terms, especially also utilizing the measured angular position, with the aid of the measuring device.

A further sensor, by which accelerations or vibrations or temperatures are measurable, may be mounted on the circuit board. In particular, two or more further sensors may be mounted on the circuit board.

A memory component is fixed in place on the circuit board, which may be used as a data logger for storing information that is based on the signals generated by the first position sensing elements and/or the second position sensing elements and/or the further sensor.

The first position sensing elements and/or the second position sensing elements and/or the further sensor may be connected to the annular circuit board by flexible circuit boards.

The first position sensing elements and/or the second position sensing elements may include magnet sensors, and the structures of the first graduation and/or the second graduation may be arranged as magnetic poles. The first position sensing elements and/or the second position sensing elements may operate on the basis of a magnetoresistive principle, for example, or may be arranged as Hall-effect sensors. Alternatively, the measuring device may also be based on an optical or inductive measuring principle, and combinations of the principles are possible as well, with the result that the first graduation is able to be scanned using a principle that differs from that used for the second graduation.

The sensors of the first position sensing elements by which the first graduation is scannable may be disposed at an offset with regard to the axial direction from the sensors of the second position sensing elements by which the second graduation is scannable.

At least the second graduation (or both graduations) may be applied on a lateral side of a cylindrical scale element.

For example, an annular body, which is able to be fastened to a shaft, may be provided as a scale element. However, the first and/or the second graduation may alternatively also be directly applied to the shaft.

According to an example embodiment of the present invention, a component assembly for a spindle or for a rotary table has a measuring device, which includes a circuit board on which an electronic component is fixed in place, so that signals from the first and/or the second position sensing elements are able to be processed by the electronic component, the component assembly having a housing and the circuit board being enclosed by the housing.

The component assembly may include a shaft, a preloading element, and two bearings, arranged as rolling bearings. The scale element is mounted so as to be axially displaceable in relation to the shaft, and the bearings are axially preloaded with the aid of the preloading element such that the scale element is situated in the power flow of the axial preloading. Alternatively or additionally, the measuring device includes a measuring device housing, which is mounted in an axially displaceable manner with respect to the shaft, the bearings being axially preloaded with the aid of the preloading element such that the measuring device housing is arranged in the power flow of the axial preloading.

With the aid of the measuring device, axle displacements of a tool spindle, for example, are able to be detected online, the rotor temperature may be measured in a contact-free manner, imbalances and vibrations of the axis of rotation may be recorded, and information pertaining to operating states (max. temperature, max. vibrations, operating hours, etc.) are able to be stored over a longer period of time and output again. In particular based on the measured values of the angular position and the position of the scale element in the plane perpendicular to the axis of rotation (axle displacement), a correction of the setpoint position in the machining and/or measuring process is able to be performed through a numerical control. Thus, for example, a trajectory of a cutting tool, which is possibly clamped in a spindle, may be corrected during the machining of a workpiece. The measuring device may particularly be configured such that correction values are generated in the interplay with a numerical control, the correction values being based on the position data measured by the measuring device in conjunction with the absolute angle position.

For this purpose, the measuring device may, for example, provide a resolution of under 2 μm, in particular a resolution of less than 1 μm, especially less than 750 nm. These values for the resolutions are able to be achieved both for the determination of the axial and the lateral positions, that is to say, in the plane perpendicular to the axis of rotation.

Further features and aspects of example embodiments of the present invention are described in more detail below with reference to the appended Figures.

DETAILED DESCRIPTION

Figure 1:
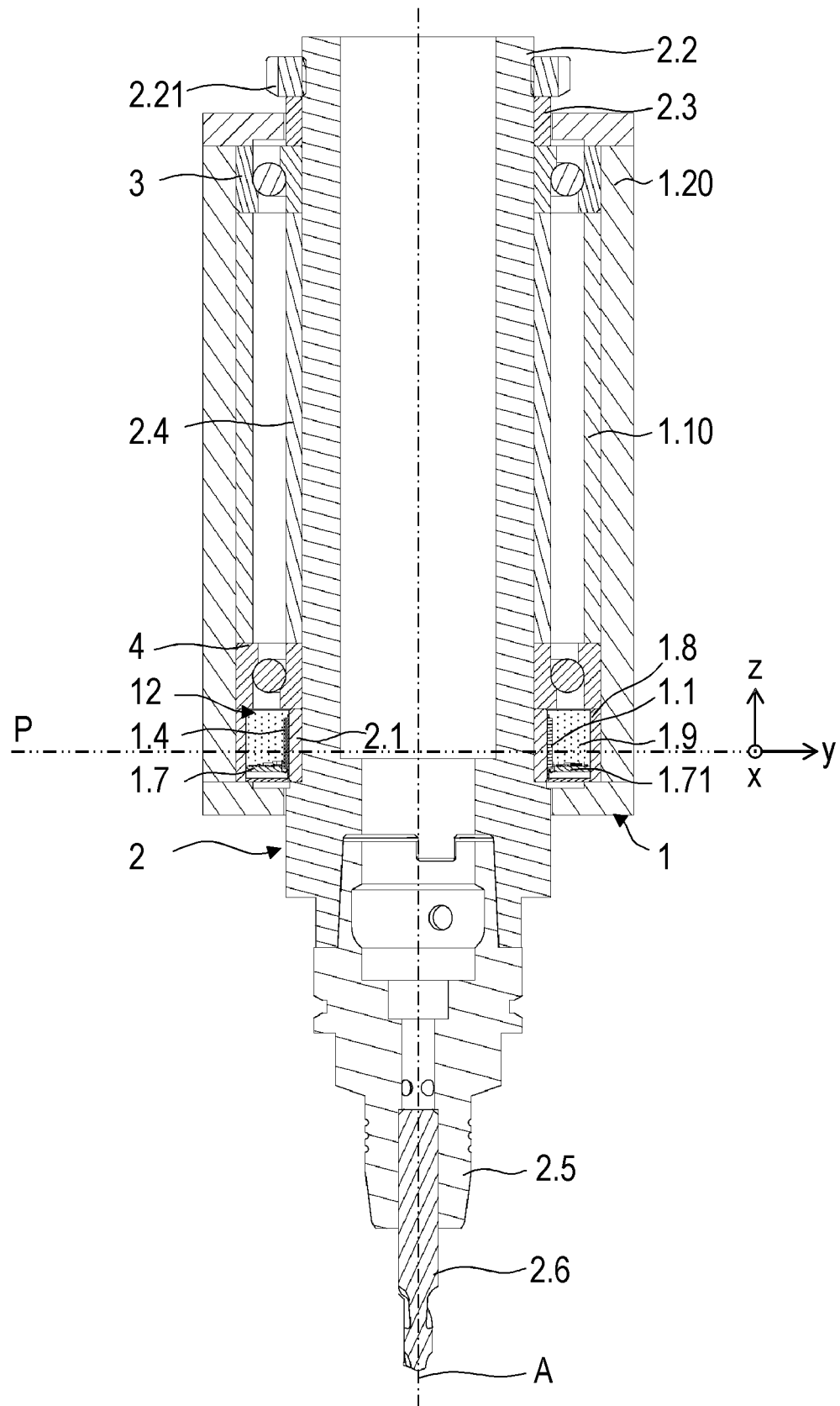
FIG. 1 is a longitudinal cross-sectional view through a spindle with a measuring device.

FIG. 1 is a longitudinal cross-sectional view through a spindle of a machine tool, the machine tool being arranged as a cutting machine, for example. The spindle includes a first component assembly 1, which may also be referred to as a stator, and a second component assembly 2, which is rotatable about an axis of rotation A relative to first component assembly 1 and thus functions as a rotor. In addition, the spindle includes two bearings 3, 4, which, in this example, are arranged as rolling bearings, e.g., as skew-angle roller bearings. Second component assembly 2 of the spindle is driven by a motor.

First component assembly 1 has a housing 1.20 in which bearings 3, 4 and a measuring device 12 are accommodated, a measuring device housing 1.8 being connected to housing 1.20. In addition, a spacer bush 1.10 is situated axially between the outer rings of bearings 3, 4.

Second component assembly 2 includes a shaft 2.2 on which a scale element 2.1 of measuring device 12, the inner rings of bearings 3, 4 as well as a spacer ring 2.3 and a spacer bush 2.4 are situated. A tool receptacle 2.5, e.g., a hollow-taper shank, is fastened to one end of shaft 2.2, in the illustrated example embodiment. A cutting tool 2.6 is mounted in this tool receptacle 2.5.

Figure 2:
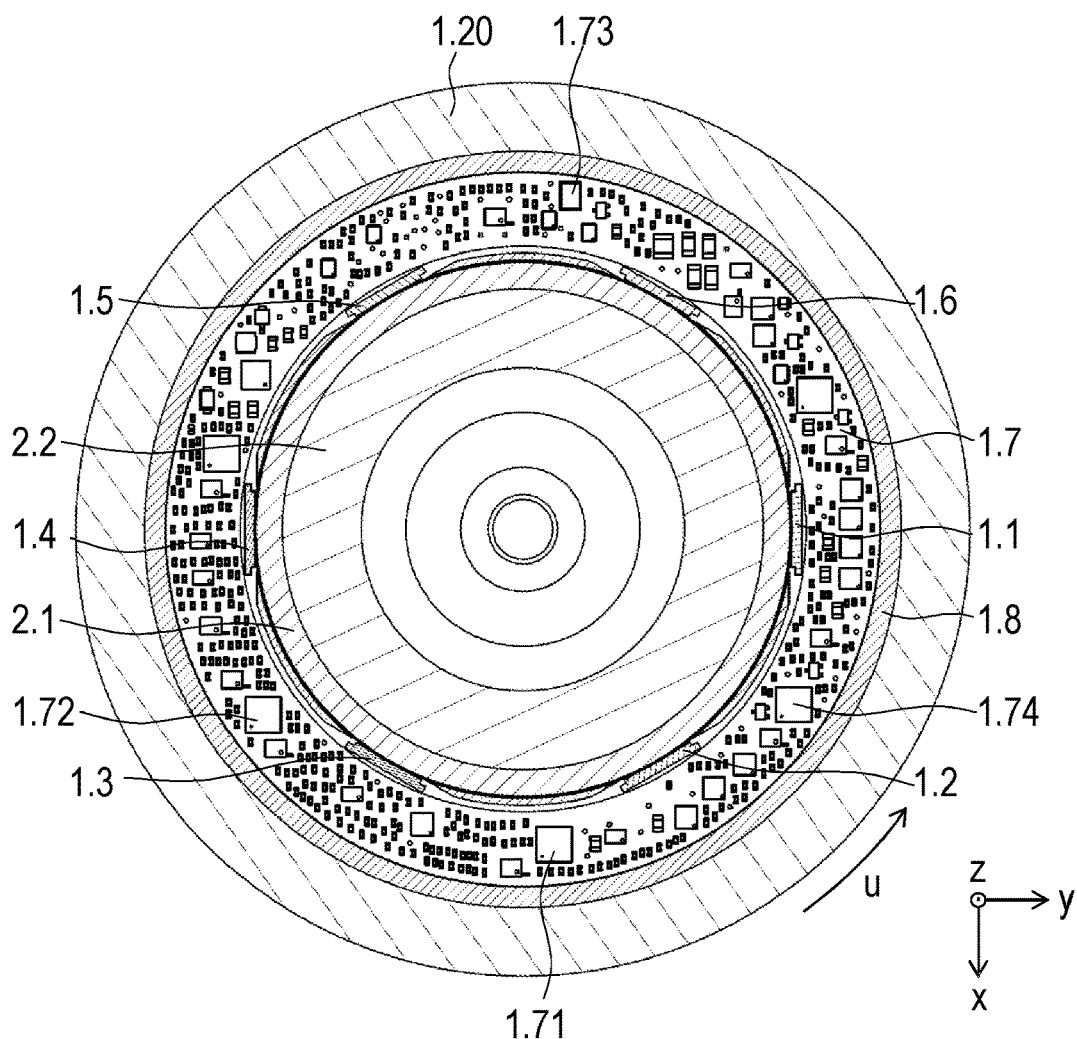
FIG. 2 is a cross-sectional view through the spindle with the measuring device.
Figure 3:
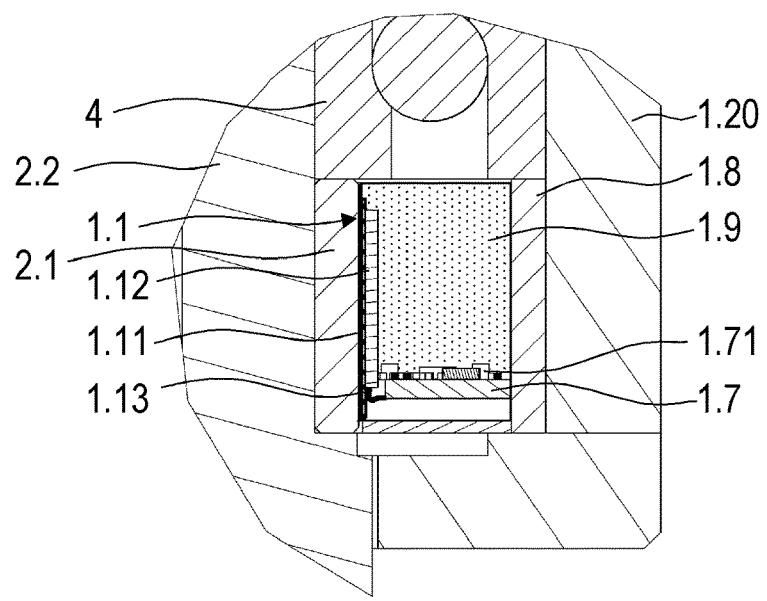
FIG. 3 is an enlarged, longitudinal cross-sectional view of the measuring device.

Measuring device 12 will first be described with reference to FIGS. 2 and 3. As illustrated in FIG. 2, which is a cross-sectional view through the spindle at the level of measuring device 12 in a plane P, shaft 2.2, on which scale element 2.1 is secured in an axially displaceable but torque-proof manner, can be seen arranged inside in the section. Shaft 2.2 and scale element 2.1 are situated so as to be rotatable in relation to a circuit board 1.7. For reasons of clarity, the depiction of a casting compound 1.9, which is illustrated in FIGS. 1 and 3, is omitted in FIG. 2. Measuring device 12 includes three first position sensing elements 1.1, 1.3, 1.5 and three second position sensing elements 1.2, 1.4, 1.6. First position sensing elements 1.1, 1.3, 1.5 are situated at an offset from one another in circumferential direction u in each case. In the same manner, second position sensing elements 1.2, 1.4, 1.6 are situated at an offset from one another in circumferential direction u.

Position sensing elements 1.1 to 1.6 and annular circuit board 1.7 are connected to measuring device housing 1.8 in a torque-proof manner, and thus are connected in a torque-proof manner to housing 1.20 of the spindle. Among others, a first electronic component 1.71, a second electronic component 1.72, a further sensor 1.73, and a memory component 1.74 are assembled on circuit board 1.7.

With the aid of a preloading element 2.21 (e.g., a shaft nut), mechanical preloading is able to be introduced into bearings 3, 4 of the spindle. In the illustrated exemplary embodiment, the measuring device is positioned such that annular scale element 2.1, which is displaceable relative to shaft 2.2, and the annular measuring device housing 1.8 of measuring device 12, which is displaceable relative to shaft 2.2, are situated in the power flow of the axial preloading.

With reference to FIG. 3, the configuration of position sensing elements 1.1 to 1.6 is described based on position sensing element 1.1, which is allocated to first position sensing elements 1.1, 1.3, 1.5; all position sensing elements 1.1 to 1.6 have substantially the same configuration in the illustrated exemplary embodiment and are electrically contacted with circuit board 1.7 in the same, or similar, manner, in each case. Position sensing elements 1.1 to 1.6 are arranged, for example, as magnetic sensing elements. Position sensing element 1.1 includes a sensor 1.11 and a board 1.12, which is situated radially outside relative to sensor 1.11. A flexible circuit board 1.13 electrically connects board 1.12 to annular circuit board 1.7. In the illustrated exemplary embodiment, sensor 1.11 is arranged as a magnetoresistive detector. More specifically, sensor 1.11 may be arranged in the form of magnetoresistive structures on a glass substrate and may be electrically connected to board 1.12 by a through-hole plating.

In contrast, an air gap, which has a size of less than 200 μm in the illustrated exemplary embodiment, is arranged between sensor 1.11 or position sensing elements 1.1 through 1.6 and scale element 2.1. The sensors of first position sensing elements 1.1, 1.3, 1.5 are situated at an offset with regard to axial direction z from the sensors of second position sensing elements 1.2, 1.4, 1.6.

In the illustrated exemplary embodiment, scale element 2.1 is arranged as a cylindrical or annular body, on whose lateral surface both first graduation 2.11 and second graduation 2.12 are situated, first graduation 2.11 being situated at an offset with regard to axial direction z from second graduation 2.12.

Figure 4:
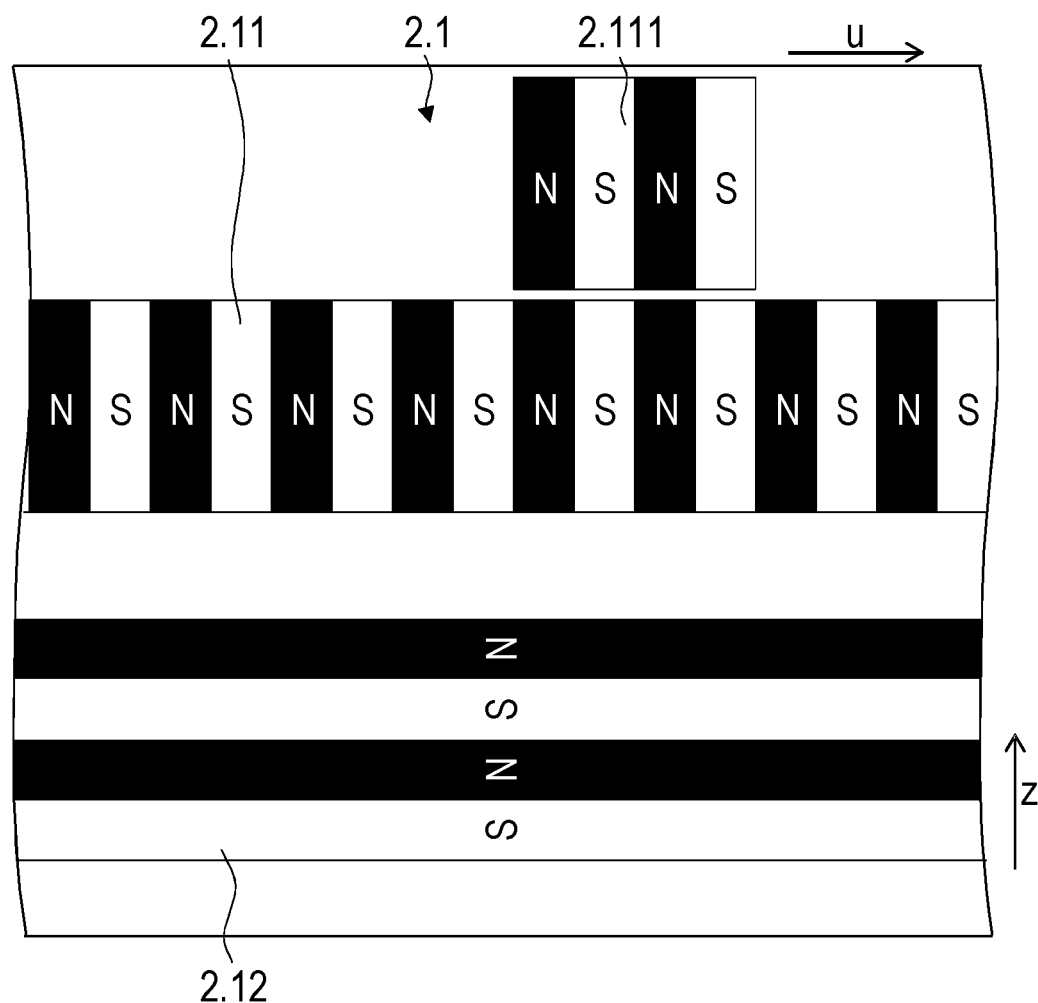
FIG. 4 is an enlarged view of a scale element of the measuring device.

FIG. 4 is an enlarged lateral-side view of scale element 2.1. First graduation 2.11 includes regular structures or lines (black and white rectangles in FIG. 4), which are situated in parallel next to one another along a first direction, the first direction having a directional component in circumferential direction u. In the illustrated exemplary embodiment, the first direction is identical to circumferential direction u. In addition, first graduation 2.11 includes a reference mark 2.111.

Second graduation 2.12 includes regular structures or lines (black and white rectangles in FIG. 4), which are situated in parallel next to one another along a second direction, the second direction having a directional component in the axial direction. In the illustrated exemplary embodiment, the second direction is identical to axial direction z.

In other words, first graduation 2.11 includes regular structures, which basically have a rectangular configuration in this case and whose long sides are oriented in the second direction and are disposed in parallel next to one another. In the illustrated exemplary embodiment, the second direction extends parallel to axis of rotation A or parallel to direction z. Second graduation 2.12 includes regular structures as well, which are circumferentially arranged in this instance and whose circumferential long sides are oriented in the first direction and parallel to one another. The first direction extends in circumferential direction u.

The structures in the illustrated exemplary embodiment are arranged as magnetic north and south poles.

First graduation 2.11 is scannable by first position sensing elements 1.1, 1.3, 1.5 such that an angular position of scale element 2.1 in relation to first position sensing elements 1.1, 1.3, 1.5 is able to be determined with the aid of first position sensing elements 1.1, 1.3, 1.5. The angular position within and across a rotation is able to be determined in absolute terms. For this purpose, as illustrated in FIG. 3, an incremental first graduation 2.11 as such may be used by which an absolute angular position across a rotation is able to be generated in conjunction with reference mark 2.111. As an alternative, first graduation 2.11 may be arranged for absolute encoding and, for instance, be provided in the form of a pseudo random code or a Gray code, in the sense of an encoding, i.e., including a generation of a unique code value. The signals from first position sensing elements 1.1, 1.3, 1.5 are forwarded to electronic component 1.71 to which first position sensing elements 1.1, 1.3, 1.5 are electrically connected via circuit traces of circuit board 1.7. The particularly digital values of the angular position are then generated by electronic component 1.71. In addition, using a suitable linkage of the position signals from first position sensing elements 1.1, 1.3, 1.5, the position of scale element 2.1 in plane P, which has an orthogonal orientation to axis of rotation A, i.e., the x, y coordinates of the actual position of axis of rotation A, is able to be determined in electronic component 1.71. This position, which may also be denoted as the lateral position, is a function of the loading of tool 2.6 during the machining process in the given spindle. In addition, the absolute angular position of shaft 2.2 is also allocated to the instantaneous lateral position, so that it is detectable, for example, which knife of tool 2.6 in engagement with the workpiece leads to which kind of loading of the spindle or shaft 2.2.

In the same manner, second position sensing elements 1.2, 1.4, 1.6 are electrically connected to electronic component 1.71. Second position sensing elements 1.2, 1.4, 1.6 are used for scanning second graduation 2.12, and the axial position of scale element 2.1 is able to be determined by second position sensing elements 1.2, 1.4, 1.6. The absolute angular position of shaft 2.2 is also allocated to the axial position in electronic component 1.71.

Example embodiments of the present invention make it possible, especially in the case of spindles or rotary tables, to measure their lateral and axial positions as a function of the absolute angular position of shaft 2.2. Since the mentioned spindles or rotary tables have a very stiff construction as it is, position measurements may be performed that are in the μm range or below. In the same manner, tilting of axis of rotation A in relation to housing 1.1 is able to be measured. This, too, requires a high resolution, in particular of second position sensing elements 1.2, 1.4, 1.6.

While measuring device 12 is operated, data from further sensor 1.73 in the sense of a data logger are stored in memory component 1.74, so that occurred temperatures or shock stresses, for example, are able to be recorded in a reproducible manner.

What is claimed is:

1. A measuring device for a spindle and/or for a rotary table, comprising:
    at least two first position sensing elements;
    at least two second position sensing elements;
    a scale element having a first graduation and a second graduation and being rotatable about an axis of rotation relative to the first position sensing elements and the second position sensing elements;
    wherein the first graduation includes regular structures arranged in parallel next to one another along a first direction, the first direction having a directional component in a circumferential direction;
    wherein the second graduation includes regular structures arranged in parallel next to one another along a second direction, the second direction having a directional component in an axial direction;
    wherein the first position sensing elements are offset from one another in the circumferential direction, and the first position sensing elements are adapted to scan the first graduation so that a position of the scale element in a plane that has an orthogonal orientation to the axis of rotation is determinable and so that an angular position of the scale element in relation to the first position sensing elements is determinable in absolute terms within and across a rotation with the aid of at least one of the first position sensing elements; and
    wherein the second position sensing elements are offset from one another in the circumferential direction, and the second position sensing elements are adapted to scan the second graduation.

2. The measuring device according to claim 1, wherein the measuring device includes at least three first position sensing elements and at least three second position sensing elements.

3. The measuring device according to claim 1, further comprising a circuit board, at least one electronic component being secured on the circuit board, the first position sensing elements and/or the second position sensing elements being electrically connected to the electronic component, the electronic component being adapted to process signals from the first position sensing elements and/or the second position sensing elements.

4. The measuring device according to claim 3, wherein the circuit board is annular.

5. The measuring device according to claim 3, wherein the first position sensing elements and the second position sensing elements are electrically connected to the electronic component, and the electronic component is adapted to determine the angular position, the position in the plane, and the axial position of the scale element.

6. The measuring device according to claim 3, further comprising a further sensor adapted to measure acceleration and/or temperature secured to the circuit board.

7. The measuring device according to claim 3, further comprising a memory component secured to the circuit board, the memory component arranged as a data logger adapted to store information based on signals generated by the first position sensing elements, the second position sensing, and/or a further sensor secured to the circuit board adapted to measure acceleration and/or temperature.

8. The measuring device according to claim 3, wherein the first position sensing elements, the second position sensing elements, and/or a further sensor adapted to measure acceleration and/or temperature are connected to the circuit board by at least one flexible circuit board.

9. The measuring device according to claim 1, wherein tilting of the scale element and/or the axis of rotation is determinable with the aid of the second position sensing elements.

10. The measuring device according to claim 1, wherein the first position sensing elements and/or the second position sensing elements include magnet sensors, and the structures of the first graduation and/or the second graduation are arranged as magnetic poles.

11. The measuring device according to claim 1, wherein sensors of the first position sensing elements are offset from sensors of the second position sensing elements in the axial direction.

12. The measuring device according to claim 1, wherein the second graduation is provided on a lateral side of a cylindrical scale element.

13. A component assembly for a spindle or for a rotary table, comprising:
    a housing;
    a measuring device including:
        at least two first position sensing elements;
        at least two second position sensing elements;
        a scale element having a first graduation and a second graduation and being rotatable about an axis of rotation relative to the first position sensing elements and the second position sensing elements; and
        a circuit board, at least one electronic component being secured on the circuit board, the first position sensing elements and/or the second position sensing elements being electrically connected to the electronic component, the electronic component being adapted to process signals from the first position sensing elements and/or the second position sensing elements;
    wherein the first graduation includes regular structures arranged in parallel next to one another along a first direction, the first direction having a directional component in a circumferential direction;
    wherein the second graduation includes regular structures arranged in parallel next to one another along a second direction, the second direction having a directional component in an axial direction;

wherein the first position sensing elements are offset from one another in the circumferential direction, and the first position sensing elements are adapted to scan the first graduation so that a position of the scale element in a plane that has an orthogonal orientation to the axis of rotation is determinable and so that an angular position of the scale element in relation to the first position sensing elements is determinable in absolute terms within and across a rotation with the aid of at least one of the first position sensing elements; and wherein the second position sensing elements are offset from one another in the circumferential direction, and the second position sensing elements are adapted to scan the second graduation; and wherein the circuit board is enclosed in the housing.

14. The component assembly according to claim 13, further comprising: a shaft; a preloading device; and two rolling bearings; wherein the scale element is axially displaceable in relation to the shaft, the preloading device adapted to axially preload the bearings, the scale element being arranged in a force flux of the axial preloading.

15. The component assembly according to claim 13, further comprising: a shaft; a preloading device; and two rolling bearings; wherein the measuring device includes a measuring device housing axially displaceable relative to the shaft, the preloading device adapted to axially preload the bearings, the measuring device housing being arranged in a force flux of the axial preloading.

16. A measuring device for a spindle and/or for a rotary table, comprising:

at least two first position sensing elements;

at least two second position sensing elements;

a scale element having a first graduation and a second graduation and being rotatable about an axis of rotation relative to the first position sensing elements and the second position sensing elements;

wherein the first graduation includes regular structures arranged in parallel next to one another along a first direction, the first direction having a directional component in a circumferential direction;

wherein the second graduation includes regular structures arranged in parallel next to one another along a second direction, the second direction having a directional component in an axial direction;

wherein the first position sensing elements are offset from one another in the circumferential direction, and the first position sensing elements are adapted to scan the first graduation to determine a position of the scale element in a plane that has an orthogonal orientation to the axis of rotation and to determine an angular position of the scale element in relation to the first position sensing elements in absolute terms within and across a rotation; and wherein the second position sensing elements are offset from one another in the circumferential direction, and the second position sensing elements are adapted to scan the second graduation to determine an axial position of the scale element.

* * * * *